United States Patent [19]

Sato et al.

[11] Patent Number: 4,803,238

[45] Date of Patent: Feb. 7, 1989

[54] POLYMER COMPOSITION

[75] Inventors: Atsushi Sato, Tokyo; Keiji Endo, Yokosuka; Shigenobu Kawakami, Ichikawa; Eiichi Matsuzaka, Kawasaki; Satoshi Narui, Ayase, all of Japan

[73] Assignee: Nippon Petrochemicals Company, Limited, Japan

[21] Appl. No.: 115,548

[22] Filed: Oct. 29, 1987

Related U.S. Application Data

[63] Continuation of Ser. No. 885,002, Jul. 14, 1986, abandoned.

[30] Foreign Application Priority Data

Aug. 3, 1984 [JP] Japan ................. 59-163549

[51] Int. Cl.$^4$ ................. C08C 11/22; C08C 13/04
[52] U.S. Cl. ................................................. 524/486
[58] Field of Search ............................. 524/486

[56] References Cited

U.S. PATENT DOCUMENTS

| | | | |
|---|---|---|---|
| 3,437,627 | 4/1969 | Gude | 524/486 |
| 3,833,680 | 9/1974 | Torii | 260/735 |
| 3,856,740 | 12/1974 | Takahashi | 260/33.6 AQ |
| 4,071,666 | 1/1978 | Garner | 524/486 |

*Primary Examiner*—Paul R. Michl
*Assistant Examiner*—Susan E. Shaw McBee
*Attorney, Agent, or Firm*—Scully, Scott, Murphy & Presser

[57] ABSTRACT

A compounding oil for polymers which can be used as a plasticizer, process oil, thinner, softening agent, extender or the like. The compounding oil of the invention comprises a fraction mainly containing triaryldialkanes and having boiling points in the range of 350° to 450° C., which fraction is prepared by disproportionating a by-product oil fraction at temperatures in the range of 20° to 500° C. in the presence of a disproportionation catalyst, said by-product oil fraction mainly containing diarylalkanes, having boiling points in the range of 260° to 320° C., and being obtained from the process to prepare alkylated monocyclic aromatic hydrocarbons by alkylating monocyclic aromatic hydrocarbons with olefins in the presence of an alkylation catalyst.

3 Claims, No Drawings

POLYMER COMPOSITION

This application is a continuation of application Ser. No. 885,002, filed July 14, 1986, now abandoned.

BACKGROUND OF THE INVENTION (1) Field of the Invention

This invention relates to a compounding oil for polymers. More particularly, the invention relates to a compounding oil for polymers which oil comprises a fraction that is prepared by disproportionating a fraction containing diarylalkanes which is obtained from the process to prepare alkylated monocyclic aromatic hydrocarbons by alkylating monocyclic aromatic hydrocarbons with olefins. The oil according to the present invention can be used as compounding oils such as plasticizer, process oil, thinner, softener and extender for various plastics and elastomers.

(2) Description of the Related Art

The process to prepare alkylbenzenes such as ethylbenzene, ethyltoluene and cumene by alkylating monocyclic aromatic hydrocarbons such as benzene and toluene with olefins such as ethylene and propylene, is industrially put into practice. In succession to this process, for example, ethylbenzene and ethyltoluene are dehydrogenated and the obtained materials are used as monomers for producing styrene type resins. In the case of cumene, it is consumed as a raw material of cumene process phenol.

In the above alkylbenzene preparation, diarylalkanes are produced as by-products besides the mono and polyalkylated reaction products. For example, from the process for preparing ethylbenzene by reacting benzene with ethylene with an alkylation catalyst, heavier by-product oil containing diarylalkanes such as diphenylethane and phenylethylphenylethane is produced as well as ethylbenzene and polyethylbenzene.

Even though this by-product oil is produced in large quantities, it was used only as fuel, or by obtaining a fraction containing diarylalkanes of arbitrary boiling range, it was used as electrical insulating oil or solvent for the dye of pressure-sensitive recording paper (e.g. U.S. Pat. Nos. 4,108,788; 4,111,824; 4,111,825 and 4,228,024).

This by-product oil itself has considerably high boiling points, however, it is too volatile yet as a compounding oil for polymers. Furthermore, because its diffusion velocity in polymers is large, when it is compounded into polymers, bleeding is liable to occur in some polymers. Therefore, the by-product oil has not been used as a compounding oil for polymers besides the abovementioned uses.

Furthermore, as a triaryldialkane, distyrenated xylene that is produced by adding styrene to xylene with sulfuric acid catalyst is known as a plasticizer for polymers (e.g. U.S. Pat. Nos. 3,833,680 and 3,856,740). However, in comparison with its boiling point, the viscosity and pour point are considerably high which fact is not always satisfactory in use.

BRIEF SUMMARY OF THE INVENTION

It is, therefore, the primary object of the present invention to provide an improved compounding oil for polymers which is free from the above-described disadvantages in the conventional art.

Another object of the present invention is to provide a new compounding oil for polymers which is produced from the foregoing by-product oil, thereby intending to made good use of the by-product oil.

According to the present invention, the compounding oil for polymers is produced form a by-product oil fraction containing diarylalkanes and having boiling points of 260° to 320° C. which fraction is obtained from the process to prepare alkylated monocyclic aromatic hydrocarbons by alkylating monocyclic aromatic hydrocarbons with olefins. In the invention, the by-product oil fraction is disproportionated at temperatures in the range of 20° to 500° C. in the presence of a disproportionation catalyst to obtain a fraction mainly containing triaryldialkanes having boiling points in the range of 350° to 450° C.

DETAILED DESCRIPTION OF THE INVENTION

The olefins used for the alkylation are lower olefins such as ethylene and propylene. the monocyclic aromatic hydrocarbons are benzene and lower alkylbenzenes such as toluene.

An alkylation catalyst is used in the reaction between the olefins and monocyclic aromatic hydrocarbons. As the alkylation catalysts, any of known alkylation catalyst is used. For example, Lewis acids such as aluminum chloride, ferric chloride and boron fluoride, inorganic acids such as sulfuric acid and phosphoric acid, solid acids such as silica-alumina and synthetic zeolites, heteropoly acids such as silicotungstic acid, and super strong acids such as trifluoromethane sulfonic acid and super strongly acidic cation exchange resin namely Nafion (trademark, made by E. I. du Pont de Nemours). In the industrial practices, when benzene is alkylated with ethylene, silica-alumina, phosphoric acid and boron fluoride as well as aluminum chloride and synthetic zeolite are used. When toluene is alkylated with ethylene, mainly synthetic zeolites, especially, crystalline aluminosilicate zeolites of the so-called ZSM-5 type zeolites such as ZSM-5 or ZSM-11 are mainly used.

The above-mentioned alkylation is widely put into practice as preparation processes for lower alkylbenzenes such as ethylbenzene, ethyltoluene and cumene. Ethylbenzene and ethyltoluene that are produced by alkylating benzene and toluene with ethylene, are dehydrogenated into styrene and methylstyrene, respectively, and they are consumed in large quantities for producing polystyrene type polymers.

An example of ethylbenzene preparation process will be described, in which benzene is alkylated with ethylene in the presence of aluminum chloride catalyst.

The molar ratio of the feed of benzene to ethylene is, for example, about 10:1 to about 3:1. In liquid phase alkylation, 0.005 to 0.030 part of catalyst is used relative to one part of ethylbenzene to be produced. The reaction is carried out at temperatures of 90° to 150° C., pressures of 0.5 to 15 kg/cm$^2$ and durations of 20 minutes to 3 hours.

Through the above alkylation, unreacted benzene, aimed ethylbenzene, polyethylbenzenes such as diethylbenzene and triethylbenzene and the by-product oil fraction containing diarylalkanes are obtained.

After the alkylation, the catalyst is removed by a conventional method. For example, the catalyst is separated by sedimentation in a settler, which is followed by neutralization and repeated water rinsing.

Then the unreacted benzene (b.p. 80° C.), ethylbenzene (b.p. 136° C.) and polyethylbenzene (b.p. 176° to 250° C.) are recovered by distillation from the alkylation product to obtain the by-product oil, as the remainder, containing diarylalkanes.

The by-product oil fraction that is especially preferable for use in the invention is those which are obtained from the process to produce ethylbenzene or ethyltoluene by alkylating benzene or toluene with ethylene. This by-product oil fraction is substantially comprises diarylalkanes and can be obtained in large quantities at low cost. Furthermore, the effect of disproportionation of the invention can be produced markedly. Accordingly, the above by-product oil fraction is desirable as the starting material to be used in the present invention.

In the present invention, the above-described starting material is subjected to disproportionation in the presence of a disproportionation catalyst.

By the above-described alkylation, alkylbenzenes such as ethylbenzene, ethyltoluene and cumene, i.e. alkylated monocyclic aromatic hydrocarbons are produced. By the way, polyalkylated products as well as the monoalkylated products are generally produced.

In the alkylation, heavier components including diarylalkanes are produced as by-products besides the unreacted monocyclic aromatic hydrocarbons such as benzene and toluene; mono- or polyalkylated monocyclic aromatic hydrocarbons such as ethylbenzene, polyethylbenzene, ethyltoluene and polyethyltoluene. The heavier by-product oil can be obtained by distilling off the unreacted monocyclic aromatic hydrocarbons and mono- or polyalkylated monocyclic aromatic hydrocarbons from the alkylation product.

The diarylalkanes by-product in the above alkylation process are represented by the following general formula (I):

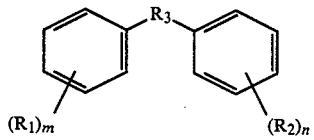

(I)

wherein each of $R_1$ and $R_2$ is a hydrogen atom or a straight chain or branched chain alkyl group, $R_3$ is a straight chain or branched chain alkylene group; and each of m and n is an integer from 0 to 3. The above diarylalkanes are used singly or in a mixture of two or more kinds.

Exemplified as diarylalkanes of the above formula (I) are diphenylmethane, phenyltolylmethane, ditolylmethane, diphenylethane, phenyltolylethane, phenylethylphenylethane and ditolylethane.

The fraction that is subjected to the disproportionation is a by-product oil fraction containing the above diarylalkanes and having boiling points in the range of 260° to 320° C., preferably 260° to 310° C. Meanwhile, by-product oil fractions having boiling points above 320° C. are not desirable because good effect of disproportionation cannot be expected.

It is possible that the by-product oil fraction to be disproportionated may be previously treated by conventional refining method with activated clay, sulfuric acid or alkaline material.

The disproportionation catalysts are exemplified by Lewis acids such as aluminum chloride and ferric chloride, solid acids such as silica-alumina and synthetic zeolites represented by ZSM-5 type zeolites such as ZSM-5 and ZSM-11, heteropoly acids such as silicotungstic acid, super strong acids such as trifluoromethane sulfonic acid and super strongly acidic cation exchange resin such as Nafion (trademark, made by E. I. du Pont de Nemours). However, sulfuric acid and natural clay such as activated clay are not preferable because the disproportionation does not proceed substantially.

The temperature for the disproportionation can be selected in a wide range of 20° to 500° C. with the kind of used catalyst. For example, the temperature range of 20° to 150° C. is suitable for Lewis acids such as aluminum chloride; 150° to 230° C., for Nafion; and 250° to 500° C., for synthetic zeolite. The disproportionation does not occur at temperatures lower than the above range, while side reaction such as decomposition occurs at temperatures higher than the above range, neither of which is, accordingly, desirable.

With regard to the type of reaction, any of batchwise and continuous types can be employed. Preferable reaction times are 20 minutes to 10 hours in batchwise reaction and 0.5 to 10 in SV in continuous reaction. The pressures of disproportionation are not especially limited, however, they are generally in the range of atmospheric pressure to 10 kg/cm$^2$.

The substances that are produced in the disproportionation as a lighter fraction are $C_6$ to $C_9$ monocyclic aromatic hydrocarbons of alkylbenzenes such as benzene, toluene, xylene, ethylbenzene, diethylbenzene and cumene, which can be obtained as a monocyclic hydrocarbon fraction of boiling points below 160° C.

Furthermore, by the treatment of disproportionation according to the present invention, a fraction of 350° to 450° C. in boiling points containing triaryldialkanes is obtained, which fraction is more valuable than the by-product oil fraction used as the starting material. The triaryldialkanes produced in this disproportionation are represented by the following structural formula (II):

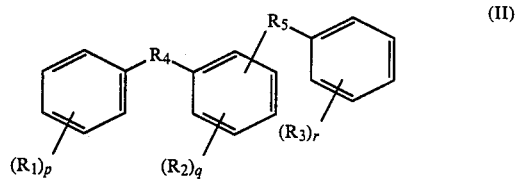

(II)

wherein each of $R_1$, $R_2$ and $R_3$ is a hydrogen atom or a straight chain or branched chain alkyl group; each of $R_4$ and $R_5$ is a straight chain or branched chain alkylene group; and each of p, q and r is an integer from 0 to 3.

A fraction having boiling points above 450° C. is not desirable because its viscosity is too high. Thus the fraction having boiling points in the range of 350° to 420° C. is more preferable.

After the disproportionation, the reaction product is distilled to obtain a fraction containing monocyclic aromatic hydrocarbons that are lighter than the starting by-product oil fraction, a fraction containing unreacted diarylalkanes, and a fraction containing triarylalkanes that are heavier than the starting by-product oil fraction. Incidentally, when the disproportionation is carried out in batchwise, the reaction is desirably caused to proceed with eliminating the produced lighter fraction of monocyclic aromatic hydrocarbons because the yield of the heavier fraction can be improved.

The compounding oil for polymers of the invention can be produced in large quantities at low cost. Furthermore, it is difficultly volatile and, even though it has higher boiling points, the viscosity and pour point are low. In addition, the compounding oil has a high aromaticity so that it has relatively good compatibility with various polymers of natural and synthetic plastics and elastomers. Accordingly, it can be advantageously used as a polymer compounding oil such as plasticizer, process oil, softening oil, extender oil, diluent and thinner known in the conventional polymer processing field.

In an instance, the compounding oil for polymers of the invention is added to polymer materials when they are mixed or kneaded by a Banbury mixer, mixing roll or the like. When a polymer is prepared by polymerizing monomer or prepolymer such as, in the case of epoxy resin, polyurethane and polysulfide, the compounding oil of the invention can be previously mixed into the monomer or prepolymer.

The polymers in which the compounding oil of the invention is used are natural and synthetic plastics and elastomers.

Elastomers are exemplified by natural rubber, SBR, EDPM, NBR, CR, BR, polysulfide, polyolefin rubber, block SBR as a thermoplastic elastomer, and their prepolymers.

The plastics are thermoplastic or thermosetting plastics and are exemplified by polyvinyl chloride, polyolefins such as polyethylene, chlorinated polyolefin, polystyrene, polyacrylate, polyvinyl acetate, and their ethylene copolymers such as ethylene/vinyl acetate copolymer, ethylene/methacrylate copolymer and ethylene/acrylate copolymer. Furthermore, included in usable plastics are epoxy resin, polyurethane, polyester, polyimide, polyamideimide, nylon and their prepolymers.

The foregoing polymers will be further described in the following.

Thermoplastic elastomers are exemplified by styrene/butadiene block copolymer, styrene/isoprene block copolymer and styrene/monoolefin block copolymer.

Included in polyolefins are low density or high density polyethylene, ethylene/α-olefin copolymer and polypropylene.

Polyacrylate is a polymer made by polymerizing acrylate monomer and, as acrylate monomers, methyl acrylate, ethylacrylate, methyl methacrylate, ethyl methacrylate, acrylamide, acrylic acid and methacrylic acid are used. These are sometimes copolymerized with vinyl chloride or styrene.

Polysulfide is generally used for compounding as liquid polysulfide and it is used as a sealant by being vulcanized. It is available in the market as a trademark of "Thiokol".

Polyurethane is a resin that is prepared by polyaddition-condensation of di- or triisocyanate with a curing agent having two or more active hydrogens. The compounding oil and other additives are usually added the stage of oligomer. The diisocyanates are exemplified by tolylene diisocyanate (TDI) and phenylene diisocyanate. The curing agents are exemplified by trimethylolpropane, ethylene glycol, ethylenediamine and ethanolamine.

The compounding oil of the invention is used by being compounded into the above polymers to produce finally cast articles or molded articles such as tires, hoses and films. Furthermore, it is also used for preparing pressure-sensitive adhesive agents, other adhesives, sealants, inks, varnishes, laquers, paints and other coating agents such as carpet backing agents.

The compounding ratio of the compounding oil of the invention to polymers can be varied properly according to properties and uses of polymers. The ratio is generally in the range of 0.1 to 200, preferably 0.5 to 150, parts by weight to 100 parts by weight of a polymer. The ratio above 200 is not desirable because bleeding will occur. The ratio below 0.1 is also undesirable because the effect of the addition of compounding oil cannot be produced.

When the compounding oil is added to polymers, conventionally known additives such as plasticizer, softening agent, extender and thinner can be used together at arbitrary ratios according to the uses of polymer.

Furthermore, when the compounding oil of the invention is compounded into polymers, it can be mixed in a suitable ratio with inorganic fillers such as calcium carbonate, carbon black, tackifiers such as rosin and petroleum resin, waxes and pigments.

The present invention will be described in more detail with reference to the following examples.

EXAMPLE 1

Using aluminum chloride catalyst, alkylation was carried out by reacting batchwise benzene with ethylene in a molar ratio (benzene:ethylene) of 5:1 at 130° C. and 4.9 kg/cm$^2$ for 1 hour. After that, the catalyst was deactivated and the reaction mixture was rinsed with water and dried. The unreacted benzene, ethylbenzene and polyethylbenzene were distilled off from the above obtained reaction mixture to recover a heavier fraction. Then, a by-product oil fraction containing diarylethanes was obtained. The composition of the fraction was as follows:

| By-Product Oil Fraction | |
| --- | --- |
| Boiling Point | 260–310° C. |
| Composition | % by weight |
| $C_{14}$–$C_{16}$ diarylethanes | 71 |
| Others | 29 |
| Total | 100 |
| (Triaryldialkane was scarcely contained.) | |

Then, 30 g of aluminum chloride was added to 2000 ml of the above by-product oil fraction and it was disproportionated at 80° C. for 5 hours under atmospheric pressure with stirring.

After the disproportionation, the catalyst was deactivated and the reaction mixture was rinsed with water and dried. It was followed by distillation to obtain a $C_6$–$C_9$ monocyclic aromatic hydrocarbon fraction of 80° to 160° C. in boiling points (yield: 5.0%), unreacted by-product oil fraction and heavier fraction of 350° to 400° C. in boiling points (yield: 14.8%).

It was confirmed that the above heavier fraction mainly contained triaryldialkanes by GC-mass spectrum analysis. Furthermore, even though the fraction has high boiling points, the pour point and viscosity of the fraction were low as follows:
Pour point: −27.5° C.
Viscosity: 18.5 cSt (at 40° C.)
This heavier fraction will be hereinafter referred to as "Compounding Oil 1".

EXAMPLE 2

Using synthetic zeolite ZSM-5, toluene was alkylated with ethylene under the following conditions:

Reaction temperature: 500° C.
Toluene/ethylene: 5 (molar ratio)
WHSV: 10

After the alkylation, unreacted toluene, ethyltoluene and polyethyltoluene were distilled off from the reaction mixture to obtain a heavier fraction, which had the following property and composition:

| By-Product Oil Fraction | |
|---|---|
| Boiling Point | 260–300° C. |
| Composition | % by weight |
| $C_{14}$–$C_{15}$ diarylmethanes | 59.1 |
| $C_{16}$ diarylethanes | 25.9 |
| Others | 15.0 |
| Total | 100.0 |
| (Triaryldialkane was scarcely contained) | |

The above by-product oil fraction (2000 ml) was disproportionated at 200° C. for 3 hours under atmospheric pressure by using 50 g of super strongly acidic cation exchange resin (trademark: Nafion made by du Pont de Nemours). During the disproportionation, the produced lighter fractions of benzene and $C_7$–$C_9$ alkylbenzenes (monocyclic aromatic hydrocarbon fraction) were removed continuously from the reaction system.

After the disproportionation, the catalyst was filtered off and 1550 ml of the filtrate was distilled to recover Fraction 2 containing diarylalkanes corresponding to unreacted fraction and Fraction 3 containing heavier triaryldialkane. Incidentally, as the lighter fraction that were removed during the disproportionation was also collected, it is also shown in the following:

| Fraction | Boiling Point | Recovery |
|---|---|---|
| Lighter fraction | 80–160° C. | 9.9% |
| Fraction 3 | 350–400° C. | 29.5% |

It was confirmed that the above Fraction 3 mainly contained triaryldialkanes by GC-mass spectrum analysis. The properties of the fraction were low as follows:
Pour point: −35° C.
Viscosity: 16.8 cSt (at 40° C.)

This fraction will be hereinafter referred to as "Compounding Oil 2".

COMPOUNDING EXAMPLES

The Compounding Oils 1 and 2 in Examples 1 and 2 were compounded with several kinds of polymers and the properties of the obtained compositions were determined.

For comparison purpose, similar test was carried out with regard to distyrenated xylene fraction which was prepared by adding styrene to xylene with sulfuric acid catalyst. The properties of this fraction are shown in the following. This fraction will be hereinafter referred to as "Compounding Oil 3".

| Properties of Compounding Oil 3 | |
|---|---|
| Boiling Points | 350–390° C. |
| | (Converted to atmospheric pressure) |
| Pour point | +5° C. |
| Viscosity | 300 cSt (at 40° C.) |

COMPOUNDING EXAMPLE 1

(Polyvinyl Chloride)

In a rolled foil of 60 parts of polyvinyl chloride and 40 parts of dioctyl phthalate (DOP), DOP was replaced in stages by Compounding Oil 1, Compounding Oil 2 and Compounding Oil 3, respectively. On samples of the various foils there are then determined under identical conditions the tensile strength, extension, cold impact strength and Shore hardness. The results are collected in the following Table 1.

TABLE 1

| Materials | Compounding Ratios (wt. parts) | | | |
|---|---|---|---|---|
| Polyvinyl chloride | 60 | 60 | 60 | 60 |
| DOP | 40 | 20 | 20 | 20 |
| Compounding Oil 1 | — | 20 | — | — |
| Compounding Oil 2 | — | — | 20 | — |
| Compounding Oil 3 | — | — | — | 20 |
| Test Items | Determined Values | | | |
| Tensile strength ($kg/cm^2$) | 168 | 197 | 175 | 190 |
| Extension (%) | 371 | 360 | 356 | 310 |
| Cold impact strength (°C.) | −25 | −25 | −25 | −25 |
| Shore hardness (°) | 70 | 77 | 79 | 85 |

COMPOUNDING EXAMPLE 2

(Polysulfide)

Preparation of sealant compositions and test results

A variety of polysulfide sealant materials were prepared in the manner described hereinbefore by admixing a liquid polysulfide with other addition compounds in prescribed amounts, and the properties of said sealant materials were tested. The results are summarized in Table 2.

COMPOUNDING EXAMPLE 3

(Rubber)

NBR compositions were prepared according to the formulae in Table 3 and the compositions were vulcanized at 150° C. for 60 minutes. The test results on the vulcanized products are also shown in Table 3.

TABLE 2

| Materials | Compounding Ratios (wt. parts) | | |
|---|---|---|---|
| Liquid polysulfide | 100 | 100 | 100 |
| Phenolic resin*[1] | 5 | 5 | 5 |
| $TiO_2$ | 10 | 10 | 10 |
| Activated Ca carbonate | 55 | 55 | 55 |
| Stearic acid | 0.7 | 0.7 | 0.7 |
| Sulfur | 0.1 | 0.1 | 0.1 |
| Thixotropic agent*[2] | 2 | 2 | 2 |
| Compounding Oil 1 | 22.5 | — | — |
| Compounding Oil 2 | — | 22.5 | — |
| Compounding Oil 3 | — | — | 22.5 |
| $PbO_2$*[3] | 7.5 | 7.5 | 7.5 |
| Test Items | Determined Values | | |
| Slump (mm)*[4] | <0.5 | <0.5 | <0.5 |
| Hardness (HS)*[4] | | | |
| Before heating | 36 | 37 | 33 |
| After heating | 39 | 40 | 43 |
| Tensile adhesion (Glass)*[4] | | | |
| 150% Modulus ($kg/cm^2$) | 2.8 | 2.9 | 2.7 |
| T.B. ($kg/cm^2$) | 3.8 | 3.9 | 3.5 |

TABLE 2-continued

| E.B. (%) | 530 | 540 | 470 |
|---|---|---|---|

Notes:
*¹Thiokol L LP-32 (trademark, manufactured by Thiokol Chemical Corp.)
*²Thixatrol ST (trademark, manufactured by Baker Castor Oil Co.)
*³Vulcanizing agent (Curing agent)
*⁴Test items were conducted in accordance with JIS A-5754.

TABLE 3

| Materials | Compounding Ratios (wt. parts) | | |
|---|---|---|---|
| NBR (Hycar 1042)*¹ | 100 | 100 | 100 |
| ZnO | 5 | 5 | 5 |
| Sulfur | 2 | 2 | 2 |
| Stearic acid | 1 | 1 | 1 |
| Carbon black | 30 | 30 | 30 |
| Vulcanizing accelerant (DM) | 2 | 2 | 2 |
| Compounding Oil 1 | 60 | — | — |
| Compounding Oil 2 | — | 60 | — |
| Compounding Oil 3 | — | — | 60 |
| Test Items | Determined Values | | |
| Hardness (°)*² | 30 | 30 | 29 |
| Tensile strength*² (kg/cm²) | 69 | 70 | 60 |
| Elongation (%)*² | 860 | 870 | 810 |

Notes:
*¹Trademark, manufactured by Nippon Geon Co.
*²JIS K-6301

COMPOUNDING EXAMPLE 4

(Chlorinated Rubber)

Using chlorinated rubber, the following compositions were prepared and they were tested according to JIS K-5400 and K-5401 (Test method for paints and varnishes), the results of which are shown in the following Table 4.

TABLE 4

| Materials | Compounding Ratios (wt. parts) | | |
|---|---|---|---|
| Chlorinated rubber | 100 | 100 | 100 |
| Alkyd resin modified by linseed oil | 43 | 43 | 43 |
| Solvent(*) | 167 | 167 | 167 |
| Compounding Oil 1 | 40 | — | — |
| Compounding Oil 2 | — | 40 | — |
| Compounding Oil 3 | — | — | 40 |
| Test Items | Determined Values | | |
| Pencil hardness | | | |
| on 4th day | B | B | 3B |
| on 10th day | HB | HB | HB |
| Cross cut test (after 6 days) | 8 | 8 | 8 |
| Tape test (rate of preservation percent) | 100 | 100 | 100 |

Note:
(*) Mixed xylene

COMPOUNDING EXAMPLE 5

(Ethylene/Vinylacetate (EVA))

Using EVA, the following compositions were prepared and they were tested as pressure-sensitive adhesives.

TABLE 5

| Materials | Compounding Ratios (wt. parts) | | |
|---|---|---|---|
| EVA*¹ | 100 | 100 | 100 |
| Rosin ester | 100 | 100 | 100 |
| Compounding Oil 1 | 150 | — | — |
| Compounding Oil 2 | — | 150 | — |
| Compounding Oil 3 | — | — | 150 |

TABLE 5-continued

| Test Items | Determined Values | | |
|---|---|---|---|
| Stickiness (Ball No.)*² | 15 | 14 | 8 |
| Adhesiveness (g/25 mm)*³ | 2600 | 2500 | 2000 |

Notes:
*¹MI: 150, Vinylacetate content: 28 wt %
*²J. Dow Method. Steel balls of different diameters were dropped from the uppermost end of 30°-inclined face. Resultant values are the diameters of the largest ball that stopped their downward rolling. The diameters of balls were proportional to the Ball Nos.
*³A test piece was stuck on a stainless steel sheet under pressure and it was peeled off in an angle of 180°, where the force to peel off was determined.

COMPOUNDING EXAMPLE 6

(Thermoplastic Elastomer)

Using a thermoplastic elastomer, SIS (trademark: Califrex 1107, manufactured by Shell Chemicals Co.), tests of hot-melt adhesives were carried out. The results of the tests are shown in the following Table 6.

TABLE 6

| Materials | Compounding Ratios (wt. parts) | | |
|---|---|---|---|
| SIS | 100 | 100 | 100 |
| Tackifier resin*¹ (C₅/C₉ copolymerized petroleum resin) | 150 | 150 | 150 |
| Antioxidant | 1 | 1 | 1 |
| Compounding Oil 1 | 60 | — | — |
| Compounding Oil 2 | — | 60 | — |
| Compounding Oil 3 | — | — | 60 |
| Test Items | Determined Values | | |
| Shear adhesive strength (kg/cm²)*² | 1.8 | 1.9 | 1.6 |
| Set time (sec.)*³ | 16 | 15 | 10 |

Notes:
*¹Trademark: Escorez #2101, manufactured by Exxon Corp.
*²The surface of a rubber sheet was coated with each composition at 180° C. and, after 5 seconds, a silicone oil-coated polyethylene sheet was superposed to the coated surface under pressure. It was left to stand for 1 hour. After that shear adhesive strength was determined by a tensile testing machine.
*³Using the above laminated test piece, the peeling of both sheets was observed under a load of 500 g. Among various pressure adhesion times, the shortest one was shown as the set time.

COMPOUNDING EXAMPLE 7

(Acrylic Polymer)

Using acrylic resin, tests for coating materials were carried out as follows.

Enamels of the compositions shown in Table 7 were prepared and they were tested.

TABLE 7

| Materials | Compounding Ratios (wt. parts) | | |
|---|---|---|---|
| Acrylic resin | 17.4 | 17.4 | 17.4 |
| Nitrocellulose | 10.4 | 10.4 | 10.4 |
| MIBK | 48 | 48 | 48 |
| Butanol | 8.0 | 8.0 | 8.0 |
| Toluene | 24 | 24 | 24 |
| TiO₂ | 33 | 33 | 33 |
| Compounding Oil 1 | 3.4 | — | — |
| Compounding Oil 2 | — | 3.4 | — |
| Compounding Oil 3 | — | — | 3.4 |

The above compositions were applied to the surfaces of steel sheets by an applicator. After drying, thermal resistance was tested according to JIS K-5400 at 130° C. for 2 hours. In accordance with test results, the degrees of yellowing and gloss were no good in Compounding Oil 3, while other results were the same as initial values.

COMPOUNDING EXAMPLE 8

(Urethane Resin)

With the following formulae, urethane sealants were prepared and properties of them were determined. The results thereof are shown in the following Table 8.

TABLE 8

| Materials | Compounding Ratios (wt. parts) | | |
|---|---|---|---|
| Diisocyanate[*1] | 100 | 100 | 100 |
| Curing agent[*2] | 72 | 72 | 72 |
| Calcined gypsum | 144 | 144 | 144 |
| Catalyst (Dibutyltin dilaurate) | 4 | 4 | 4 |
| Compounding Oil 1 | 144 | — | — |
| Compounding Oil 2 | — | 144 | — |
| Compounding Oil 3 | — | — | 144 |
| Test Items | Determined Values | | |
| Tensile strength (kg/cm$^2$) | 24.7 | 23.5 | 20.1 |
| Elongation (%) | 805 | 800 | 710 |
| Hardness (JIS A) | 35 | 35 | 34 |
| Adhesive strength to concrete (kg/cm$^2$) | 16.6 | 15.0 | 11.3 |

Notes:
[*1]Trademark: Takenate XL-1011, manufactured by Takeda Chemical Industries, Ltd. Condensation product of TDI and polyol.
[*2]Trademark: Takerac P-22, manufactured by Takeda Chemical Industries, Ltd. Polyether type curing agent.

COMPOUNDING EXAMPLE 9

(Epoxy Resin)

The characteristic as the thinner for epoxy resin was tested. Compositions of epoxy resin of the following formulae were prepared. Then, a curing agent was added to the compositions and the values of maximum temperature rise and time lengths to the maximum temperatures were determined. The results are shown in the following Table 9.

TABLE 9

| Materials | Compounding Ratios (wt. parts) | | |
|---|---|---|---|
| Epoxy resin[*1] | 100 | 100 | 100 |
| Triethylenetetramine (Curing agent) | 8 | 8 | 8 |
| Compounding Oil 1 | 20 | — | — |
| Compounding Oil 2 | — | 20 | — |
| Compounding Oil 3 | — | — | 20 |
| Test Items | Determined Values | | |
| Max. temp. rise (°C.) | 38 | 39 | 42 |
| Time length to max. temp. (minutes) | 170 | 170 | 180 |

Note:
[*1]Trademark: Epotohto YD-128, manufactured by Tohto Kasei Co., Ltd. Epoxy equivalent: 184–194.

What is claimed is:

1. A polymer composition comprising 100 parts by weight of a polymer selected from the group consisting of an NBR, an ethylene-vinyl acetate copolymer, an acrylic polymer, a urethane polymer, an epoxy polymer, a prepolymer of said polymers and mixtures thereof and 0.1 to 200 parts by weight of a compounding oil comprising a fraction containing a major amount of triaryldialkanes, said fraction characterized by a boiling point range of 350° to 450° C., said fraction of said compounding oil prepared by disproportionating a by-product oil fraction, said fraction containing a major amount of diarylalkanes, characterized by a boiling point range of between 260° and 320° C., said fraction obtained as a by-product of the reaction to prepare alkylated benzene or toluene by the reaction of said benzene or toluene with ethylene in the presence of an alkylation catalyst, said disproportionation reaction occurring at a temperature in the range between 20° and 500° C. in the presence of a disproportionation catalyst.

2. A composition in accordance with claim 1 wherein said fraction containing a major amount of triaryldialkanes is characterized by a boiling point range of 350° to 420° C.

3. A composition in accordance with claim 1 wherein said polymer composition comprises 100 parts by weight of said polymer and 0.5 to 150 parts by weight of said compounding oil.

* * * * *